US010101032B2

United States Patent
Abd El-Nabi et al.

(10) Patent No.: US 10,101,032 B2
(45) Date of Patent: Oct. 16, 2018

(54) MICROMIXER SYSTEM FOR A TURBINE SYSTEM AND AN ASSOCIATED METHOD THEREOF

(71) Applicant: General Electric Company, Schenectady, NY (US)

(72) Inventors: Bassam Sabry Mohammad Abd El-Nabi, Guilderland, NY (US); Gregory Allen Boardman, Liberty Township, OH (US); Gerardo Antonio Salazar Lois, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 251 days.

(21) Appl. No.: 14/675,827

(22) Filed: Apr. 1, 2015

(65) Prior Publication Data
US 2016/0290650 A1    Oct. 6, 2016

(51) Int. Cl.
*F23R 3/32*        (2006.01)
*F23R 3/28*        (2006.01)
(Continued)

(52) U.S. Cl.
CPC .............. *F23R 3/286* (2013.01); *F02C 7/222* (2013.01); *F23D 14/62* (2013.01); *F23R 3/32* (2013.01);
(Continued)

(58) Field of Classification Search
CPC .......... F02C 7/222; F23D 14/62; F23R 3/286; F23R 3/32; F23R 3/36; F23R 2900/00008
See application file for complete search history.

(56) References Cited

U.S. PATENT DOCUMENTS 4,100,733 A * 7/1978 Striebel ................... F23R 3/286
                                                239/419.3
5,339,635 A * 8/1994 Iwai ........................ F23D 14/26
                                                60/733
(Continued)

OTHER PUBLICATIONS

Extended European Search Report and Opinion issued in connection with corresponding EP Application No. 16 16 2679.1 dated Aug. 25, 2016.
(Continued)

*Primary Examiner* — Carlos A Rivera
*Assistant Examiner* — Kyle Thomas
(74) *Attorney, Agent, or Firm* — GE Global Patent Operation; John Darling

(57) ABSTRACT

A micromixer system includes a casing having a first side wall and a second side wall. Further, the micromixer system includes a plurality of pipes spaced apart from each other and disposed within the casing. Each pipe includes an inlet and an outlet formed in the first and second side walls respectively. The micromixer system includes a first plenum having a first inlet formed in the casing. The first plenum is disposed around a first portion of the plurality of pipes and fluidically coupled to the plurality of pipes. The micromixer system includes a second plenum having a second inlet formed in the casing and disposed around a second portion of the plurality of pipes. Further, the micromixer system includes a plurality of openings formed in the second side wall, surrounding the outlets of at least some pipes of the plurality of pipes, and fluidically coupled to the second plenum.

10 Claims, 6 Drawing Sheets

(51) Int. Cl.
 *F02C 7/22* (2006.01)
 *F23D 14/62* (2006.01)
 *F23R 3/36* (2006.01)
(52) U.S. Cl.
 CPC ...... *F23R 3/36* (2013.01); *F23D 2900/00008* (2013.01)

(56) References Cited

U.S. PATENT DOCUMENTS

| | | | |
|---|---|---|---|
| 6,594,999 | B2 | 7/2003 | Mandai et al. |
| 6,598,584 | B2 | 7/2003 | Beck et al. |
| 6,837,050 | B2 | 1/2005 | Mandai et al. |
| 6,837,051 | B2 | 1/2005 | Mandai et al. |
| 7,036,482 | B2 | 5/2006 | Beck et al. |
| 7,966,801 | B2 | 6/2011 | Umeh et al. |
| 8,590,311 | B2 | 11/2013 | Parsania et al. |
| 2003/0101729 | A1 | 6/2003 | Srinivasan |
| 2011/0016871 | A1* | 1/2011 | Kraemer .................. F23N 5/082 60/772 |
| 2011/0083439 | A1 | 4/2011 | Luo et al. |
| 2013/0042625 | A1 | 2/2013 | Barker et al. |
| 2013/0074510 | A1* | 3/2013 | Berry ........................ F23R 3/36 60/772 |
| 2013/0199188 | A1 | 8/2013 | Boardman et al. |
| 2013/0239581 | A1* | 9/2013 | Johnson .................. F23R 3/286 60/779 |
| 2013/0318977 | A1* | 12/2013 | Berry ...................... F23R 3/283 60/739 |
| 2014/0033718 | A1* | 2/2014 | Manoharan ............... F23R 3/10 60/725 |
| 2014/0053571 | A1* | 2/2014 | Keener .................... F23R 3/10 60/782 |

OTHER PUBLICATIONS

Srinivasan et al., "Improving low load combustion, stability, and emissions in pilot-ignited natural gas engines", Journal of Automobile Engineering,Sage journals, vol. 220, No. 2, pp. 229-239, Feb. 1, 2006.

Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

* cited by examiner

MICROMIXER SYSTEM FOR A TURBINE SYSTEM AND AN ASSOCIATED METHOD THEREOF

BACKGROUND

The present patent application relates generally to a turbine system, and, more particularly to a micromixer system used in such turbine system.

Generally, a turbine system may include a micromixer system having one or more micromixers. Such a micromixer system receives a fuel and air, and then mixes the received fuel and air to generate a premixed fuel. The micromixer system then feeds the premixed fuel to a combustor of the turbine system, for combusting the premixed fuel.

Typically, the premixed fuel provided by such micromixer system has a narrow range of a ratio of the fuel to air, depending on operating conditions of the turbine system. The micromixer system generally provides a low fuel to air ratio during a low flame temperature condition (also known as "low load condition") or full speed and/or no load condition, thereby resulting in loss of a jet flame. Further, the turbine system operating in aforementioned condition(s) may generate substantially high emissions and hence may not provide a stable operating environment to the turbine system.

Accordingly, there is a need for an improved micromixer system to enhance a turndown capability of a turbine system.

BRIEF DESCRIPTION

In accordance with one exemplary embodiment, a micromixer system is disclosed. The micromixer system includes a casing having a first side wall and a second side wall. Further, the micromixer system includes a plurality of pipes spaced apart from each other and disposed within the casing. Each pipe includes an inlet formed in the first side wall and an outlet formed in the second side wall. The micromixer system further includes a first plenum having a first inlet formed in the casing. The first plenum is disposed around a first portion of the plurality of pipes and is fluidically coupled to the plurality of pipes. The micromixer system further includes a second plenum having a second inlet formed in the casing and disposed around a second portion of the plurality of pipes. Further, the micromixer system includes a plurality of openings formed in the second side wall, surrounding the outlets of at least some pipes of the plurality of pipes, and fluidically coupled to the second plenum.

In accordance with another exemplary embodiment, a gas turbine system is disclosed. The gas turbine system includes a combustor having a liner, a flow sleeve, and a micromixer system. The flow sleeve is disposed around the liner and is located proximate to a head-end of the combustor. The micromixer system is disposed proximate to the head-end of the combustor. The micromixer system includes a casing having a first side wall and a second side wall. Further, the micromixer system includes a plurality of pipes spaced apart from each other and disposed within the casing. Each pipe includes an inlet formed in the first side wall and an outlet formed in the second side wall. The micromixer system further includes a first plenum having a first inlet formed in the casing. The first plenum is disposed around a first portion of the plurality of pipes and is fluidically coupled to the plurality of pipes. The micromixer system further includes a second plenum having a second inlet formed in the casing and disposed around a second portion of the plurality of pipes. Further, the micromixer system includes a plurality of openings formed in the second side wall, surrounding the outlets of at least some pipes of the plurality of pipes, and fluidically coupled to the second plenum.

In accordance with yet another exemplary embodiment, a method for enhancing a turndown capability of a turbine system is disclosed. The method involves receiving air into a plurality of pipes of a micromixer system. The micromixer system includes a casing having a first side wall, a second side wall, and the plurality of pipes spaced apart from each other and disposed within the casing. The method further involves receiving a first fuel into a first plenum and feeding the first fuel from the first plenum to the plurality of pipes. The first plenum is disposed around a first portion of the plurality of pipes and fluidically coupled to the plurality of pipes. The method further involves mixing the first fuel with the air within the plurality of pipes, to generate an air-fuel mixture. Further, the method involves receiving a second fuel into a second plenum disposed around a second portion of the plurality of pipes and then directing the air-fuel mixture through an outlet of each pipe, formed in the second side wall. The method further involves directing the second fuel through a plurality of openings formed in the second side wall. The plurality of openings surrounds the outlets of at least some pipes of the plurality of pipes, and fluidically coupled to the second plenum.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Embodiments discussed herein disclose a micromixer system for a turbine system. In one or more embodiments, the turbine system may be a gas turbine system, a steam turbine system, or the like. Further, as disclosed in the embodiments disclosed herein, the micromixer system may be applicable to any suitable devices without deviating from the scope of the present invention. Such micromixer system is designed to provide a substantially high turndown capacity to the turbine system during a low flame temperature condition or a full speed and/or a no load condition. In certain embodiments of the present invention, the micromixer system includes a casing, a plurality of pipes, a first plenum, and a second plenum. The casing further includes a first side wall and a second side wall. The plurality of pipes is spaced apart from each other and disposed within the casing. Each pipe includes an inlet formed in the first side wall and an outlet formed in the second side wall. The first plenum includes a first inlet formed in the casing. The first plenum is disposed around a first portion of the plurality of pipes and fluidically coupled to the plurality of pipes. The second plenum includes a second inlet formed in the casing and disposed around a second portion of the plurality of pipes. The micromixer system further includes a plurality of openings formed in the second side wall, surrounding the outlets of at least some pipes of the plurality of pipes, and fluidically coupled to the second plenum.

Figure 1:
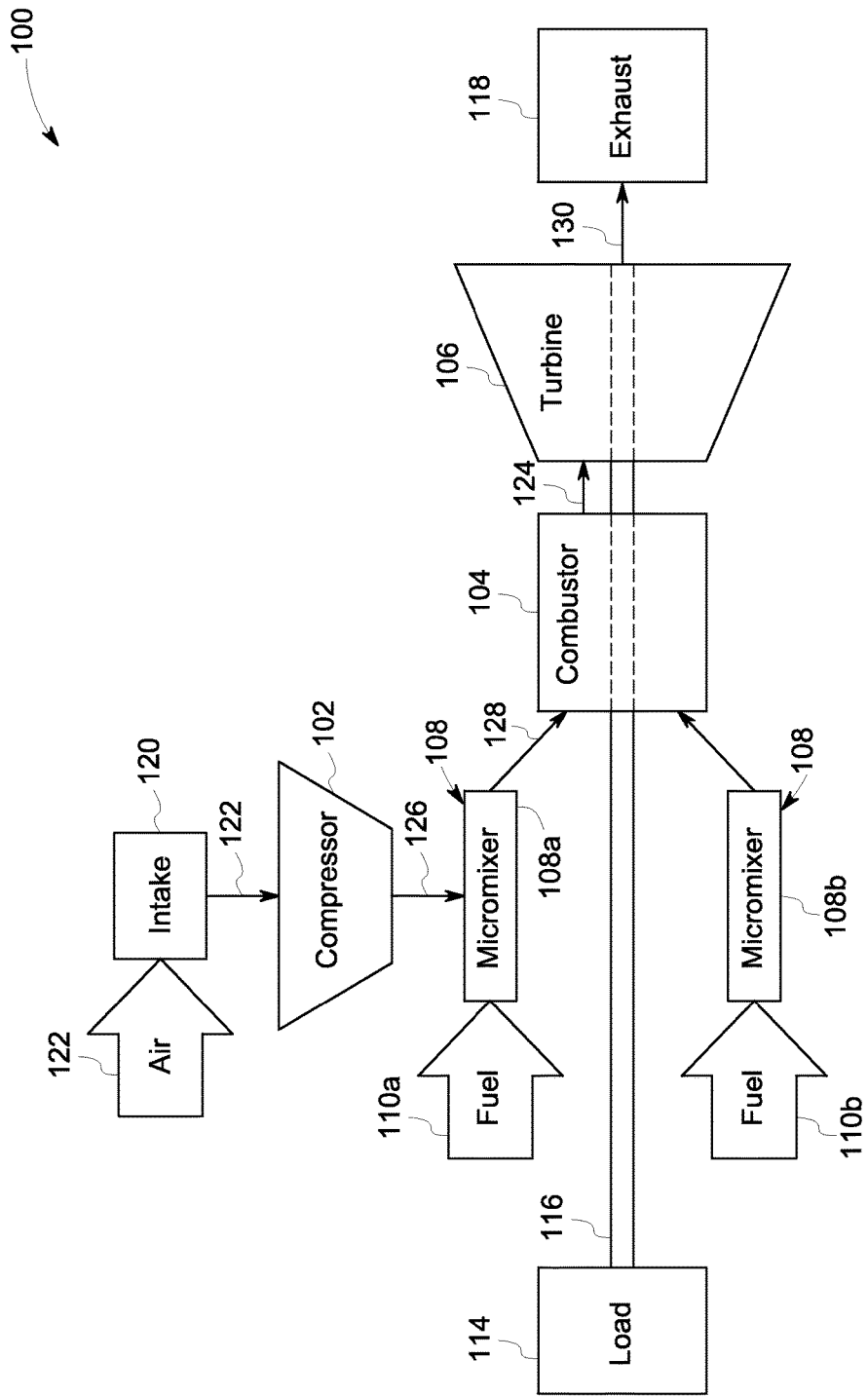
FIG. 1 is a schematic block diagram of a prior art gas turbine system.

FIG. 1 illustrates a block diagram of a prior art gas turbine system 100 including a compressor 102, a combustor 104, a turbine 106, and a micromixer system 108 having a plurality of micromixers 108a, 108b. The compressor 102 is coupled to the combustor 104 via at least one micromixer 108a. The combustor 104 is coupled to the turbine 106. In one embodiment, each micromixer 108a, 108b includes a plurality of pipes (not shown in FIG. 1). Each pipe is spaced apart from each other and disposed within a casing (not shown in FIG. 1). The number of micromixers may vary depending upon an application and design criteria.

Rotation of a plurality of blades (not shown in FIG. 1) of the compressor 102, increases pressure of air 122 received through an intake guide vane 120, to generate a compressed air 126. The air 122 may be a pressurized oxidant such as oxygen, oxygen-enriched air, oxygen reduced air, or any combination thereof. The compressed air 126 and a first fuel 110a are fed to the micromixer 108a. A second fuel 110b is fed directly to the other micromixer 108b. The first and second fuels 110a, 110b may include a liquid fuel such as petrol or diesel and/or a gaseous fuel such as natural gas or syngas. In certain other embodiments, each micromixer 108a, 108b may be configured to receive the first fuel 110a, the second fuel 110b, and the compressed air 126. It should be noted herein that the configuration of the plurality of micromixers 108a, 108b may vary depending on an application and design criteria.

In one embodiment, the first fuel 110a fed to the micromixer 108a may be different from the second fuel 110b fed to the other micromixer 108b. In certain other embodiments, the first fuel 110a and the second fuel 110b may be the same.

The compressed air 126 and the first fuel 110a are mixed within the micromixer 108a to generate an air-fuel mixture 128. The combustor 104 receives the air-fuel mixture 128 from the micromixer 108a and the second fuel 110b from the other micromixer 108b. The air-fuel mixture 128 and the second fuel 110b are combusted within the combustor 104 to generate a combustion gas 124. The combustion gas 124 is then fed to the turbine 106.

The turbine 106 includes a plurality of blades (not shown in FIG. 1), coupled to a load 114 via a shaft 116. When the combustion gas 124 flows through the turbine 106, the plurality of blades is rotated, causing the rotation of the shaft 116. As a result, the load 114 is powered by the rotation of the shaft 116. The load 114 may be an electrical generator, a propeller of an airplane, or the like. An expanded gas 130 generated from the turbine 106, then exits via an exhaust outlet 118.

Figure 2:
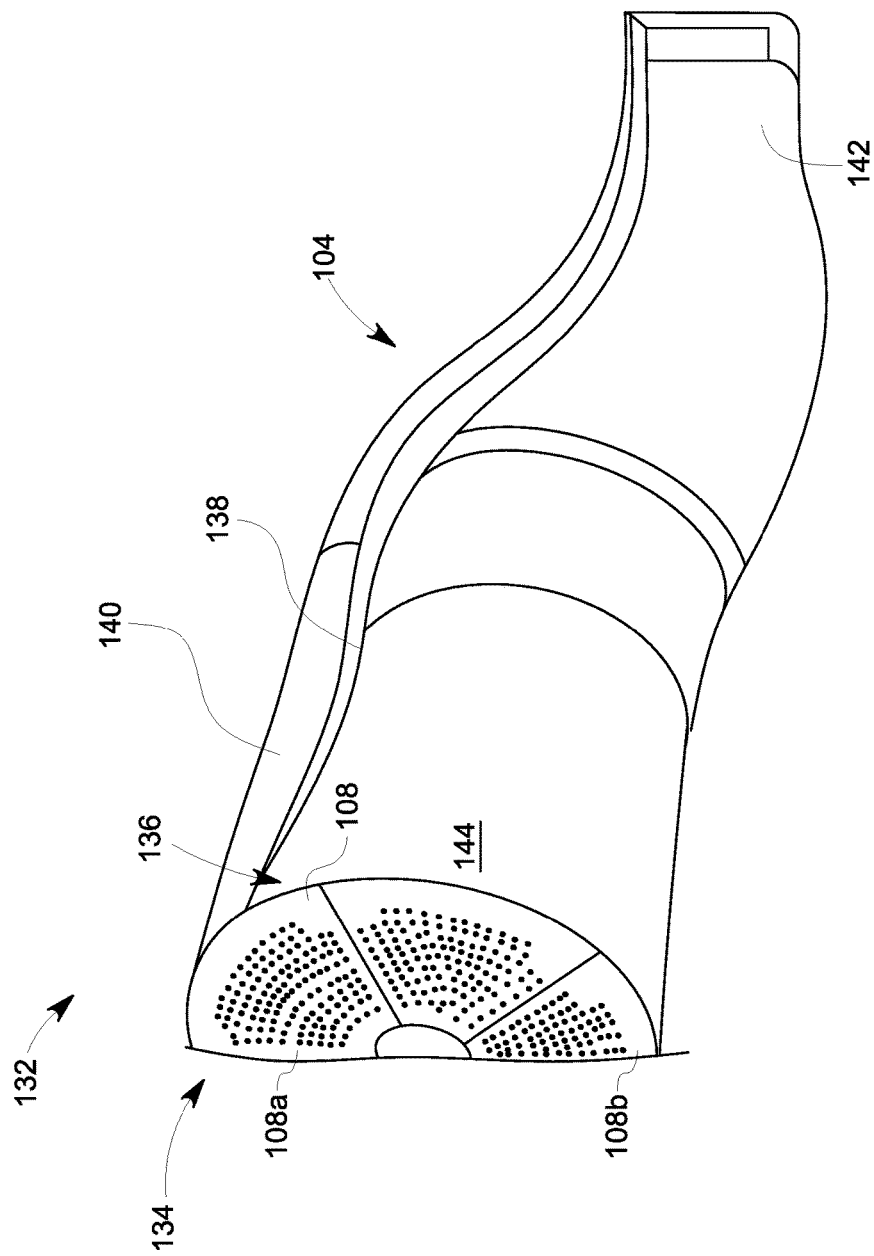
FIG. 2 is a perspective view of a portion of the gas turbine system of FIG. 1 illustrating a portion of a plurality of micromixers.

FIG. 2 is a perspective view of a portion 132 of the gas turbine system 100 of FIG. 1 illustrating the combustor 104 and a portion 134 of the micromixer system 108. The combustor 104 includes an upstream head-end 136 which is coupled to the micromixers 108a, 108b. The combustor 104 further includes a liner 138 and a flow sleeve 140 spaced radially outward and enclosing the liner 138. The combustor 104 includes a downstream end 142 disposed proximate to the turbine 106. In the illustrated embodiment, a combustion chamber of the combustor 104 is represented by a reference numeral 144.

Figure 3:
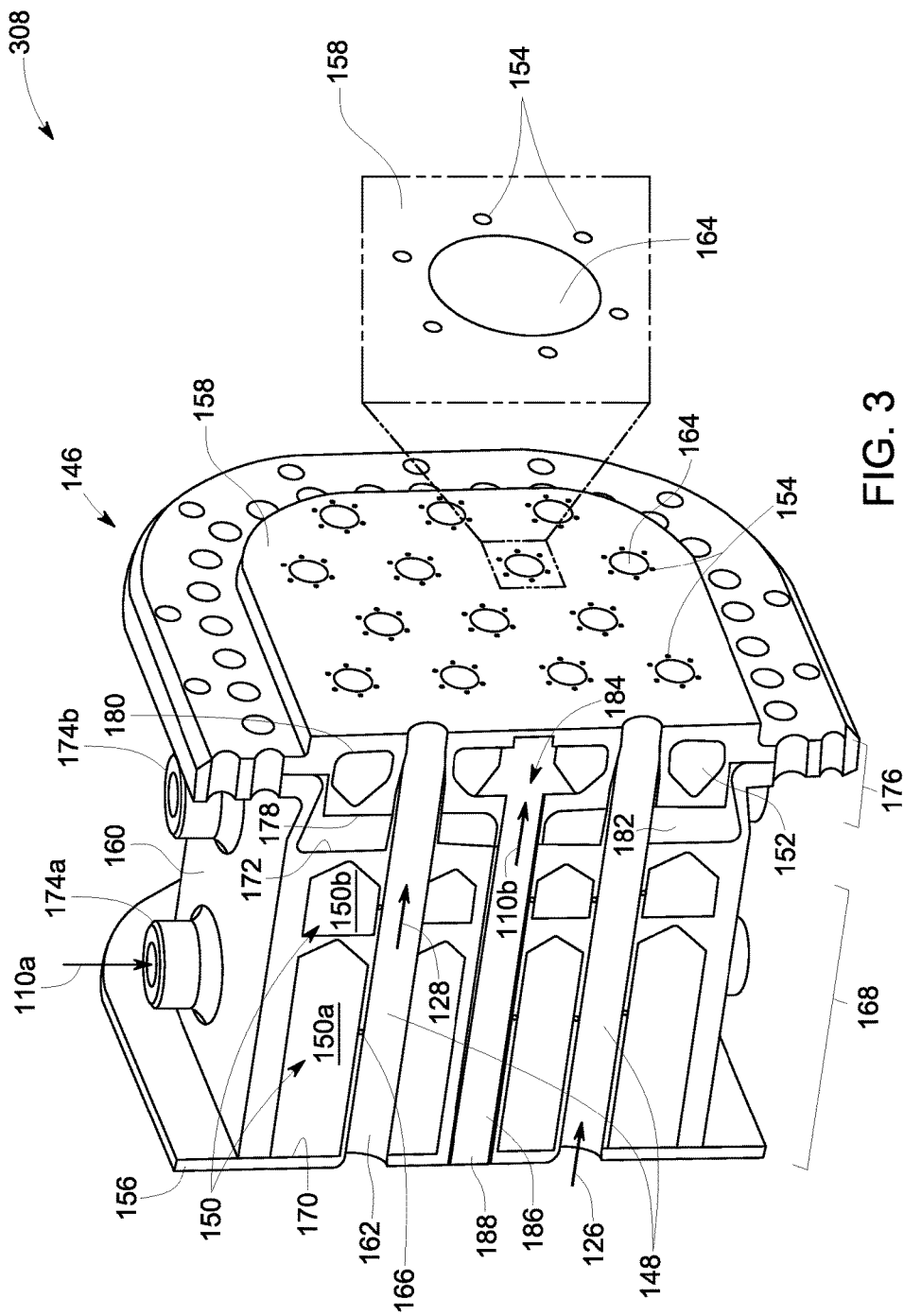
FIG. 3 is a perspective view of a micromixer system in accordance with one exemplary embodiment of the present invention.

FIG. 3 illustrates a perspective view of a micromixer system 308 in accordance with one exemplary embodiment of the present invention. The micromixer 308 includes a casing 146, a plurality of pipes 148, a first plenum 150, a second plenum 152, and a plurality of openings 154.

The casing 146 includes a first side wall 156, a second side wall 158, and an intermediate wall 160. The first side wall 156 is coupled to the second side wall 158 through the intermediate wall 160. The plurality of pipes 148 is spaced apart from each other and disposed within the casing 146. Each pipe 148 includes an inlet 162 and an outlet 164. The inlet 162 is disposed in the first side wall 156 and the outlet 164 is disposed in the second side wall 158. In certain other embodiments, the inlet 162 and the outlet 164 may protrude outwards from the first and second side walls 156, 158 respectively. The plurality of openings 154 is disposed surrounding the outlets 164 of at least some pipes 148, in the second side wall 158. Each pipe 148 includes at least one hole 166 for fluidically coupling to the first plenum 150. Each pipe 148 may have a diameter ranging approximately from about 0.5 centimeters to about 2.0 centimeters. The plurality of pipes 148 is arranged in parallel in the form of one or more bundles of closely spaced tubes. In certain other embodiments, the plurality of pipes 148 may be arranged in the form of coils having a helical profile.

Each pipe 148 is configured to direct the air-fuel mixture 128 into the combustion chamber 144 (shown in FIG. 2) of the combustor. Specifically, the air-fuel mixture 128 is fed through the outlet 164 and only the second fuel 110b is fed through the plurality of openings 154, to the combustion chamber.

The first plenum 150 is formed within the casing 146 and disposed around a first portion 168 of the plurality of pipes 148. The first portion 168 of the plurality of pipes 148 is located proximate to the first side wall 156. The first plenum 150 includes a first boundary wall 170 coupled to the first side wall 156 and a second boundary wall 172 positioned proximate to the second plenum 152. Further, the first plenum 150 includes two chambers 150a, 150b, which are fluidically coupled to each other through one or more holes (not shown in FIG. 3). Specifically, the first chamber 150a is disposed proximate to the first side wall 156 and the second chamber 150b is disposed proximate to the second plenum 152. The first plenum 150 includes a plurality of first inlets 174a, 174b formed in the intermediate wall 160. The first inlets 174a, 174b are fluidically coupled to the first chamber 150a and the second chamber 150b respectively.

The second plenum 152 is formed within the casing 146 and disposed around a second portion 176 of the plurality of pipes 148. The second portion 176 of the plurality of pipes 148 is located proximate to the second side wall 158. The second plenum 152 includes a first boundary wall 178 positioned proximate to the second boundary wall 172 of the first plenum 150 and a second boundary wall 180 coupled to the second side wall 158. Specifically, the second boundary wall 172 of the first plenum 150 and the first boundary wall 178 of the second plenum 152 are separated from each other by a gap 182. The second plenum 152 includes a second inlet 184 fluidically coupled to a tube 186 having an opening 188 formed in the first side wall 156. The opening 188 is disposed at the center of the first side wall 156. In certain other embodiments, the second inlet 184 may be disposed on the intermediate wall 160 and fluidically coupled directly to the second plenum 152.

During operation of the micromixer system 308, each pipe 148 receives the compressed air 126 through the inlet 162. The two chambers 150a, 150b of the first plenum 150 receives the first fuel 110a through the first inlets 174a, 174b. The first fuel 110a is fed from the two chambers 150a, 150b into each pipe 148 via the one or more holes 166. The first fuel 110a is then mixed with the compressed air 126 within each pipe 148 to generate the air-fuel mixture 128. The air-fuel mixture 128 is then directed through the outlet 164 of each pipe 148. The second fuel 110b is fed through the tube 186 to the second inlet 184 of the second plenum 152. The second fuel 110b is then fed through the plurality of openings 154.

Figure 4:
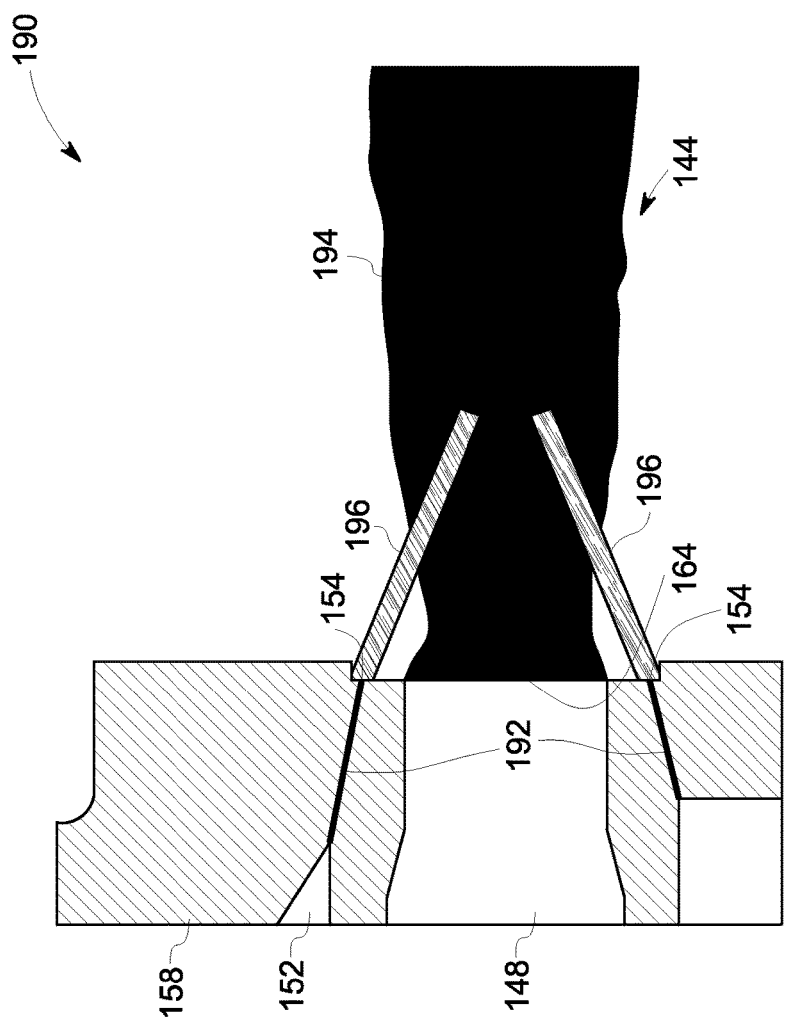
FIG. 4 is a schematic view of a portion of the micromixer system in accordance with the exemplary embodiment of FIG. 3.

FIG. 4 illustrates a schematic view of a portion 190 of the micromixer system 308 in accordance with the exemplary embodiment of FIG. 3. The portion 190 illustrates an exit of the micromixer system 308.

As discussed previously, the plurality of openings 154 is disposed surrounding the outlet 164 of each pipe 148, in the second side wall 158. Each opening 154 is fluidically coupled to the second plenum 152 via a corresponding channel from a plurality of channels 192 formed in the second side wall 158.

The air-fuel mixture 128 is directed through the outlet 164 of each pipe 148 into the combustion chamber 144. The air-fuel mixture 128 is then combusted in the combustion chamber 144 to generate a first flame 194. The second fuel 110b is directed through the corresponding channel 192 and each opening 154 into the combustion chamber 144. Specifically, the second fuel 110b is directed to the air-fuel mixture 128 in the combustion chamber 144. The second fuel 110b is then combusted in the combustion chamber 144 to generate a second flame 196 that then intersects with the first flame 194.

In certain other embodiments, the gas turbine system 100 may include a plurality of sensors (not shown in FIG. 4) communicatively coupled to a control unit (not shown in FIG. 4) for regulating a flow of the first fuel 110a and the second fuel 110b. The plurality of sensors may include an acoustics sensor, an emission sensor, and/or a speed sensor, for example. The control unit may include a processor-based device. The plurality of sensors may be configured to generate a plurality of input signals based on sensed parameters of the gas turbine system 100. The control unit may be configured to generate one or more control signals based on the plurality of input signals for regulating one or more valves (not shown in FIG. 4) so as to control feeding of the first fuel 110a and the second fuel 110b respectively to the combustion chamber 144.

The control of the flow of the first fuel 110a in the air-fuel mixture 128 and the second fuel 110b to the combustion chamber 144 may be based on a power level and acoustics level requirement of the gas turbine system 100. The power level requirement may be related to a low flame temperature condition and a full speed and/or no load condition of the gas turbine system 100. The acoustics level requirement is limited by accompanying vibrations of the gas turbine system 100.

A substantially low quantity of the first fuel 110a in the air-fuel mixture 128 and a substantially high quantity of the second fuel 110b may be fed into the combustion chamber 144 to operate the gas turbine system 100 at a low flame temperature condition, a full speed and/or a no load condition, and high vibrations of the gas turbine system 100.

Varying the quantity of supply of the first fuel 110a in the air-fuel mixture 128 and the second fuel 110b to the combustion chamber 144 increases a turndown capability of the gas turbine system 100 and enables a very stable combustion with a substantially low emission. It should be noted herein that the term "a turndown" means an ability to sustain flame from a very low temperature condition to a very high temperature condition. A substantially high quantity of the air-fuel mixture 128 and a substantially low quantity of the second fuel 110b may be fed to the combustion chamber 144 to operate the gas turbine system 100 at a normal operating condition and generate low NOx emissions. In one or more embodiments, the quantity of first fuel 110a in the air-fuel mixture 128 may be in a range of about 0 percent to about 100 percent and the quantity of second fuel 110b may be in a range of about 20 percent to about 100 percent. The quantity of the second fuel 110b may vary based on one or more operating conditions of the gas turbine system 100. Typically, the second fuel 110b is used to balance an overall fuel required to generate a required amount of power (i.e. flame) from the gas turbine system 100.

Figure 5:
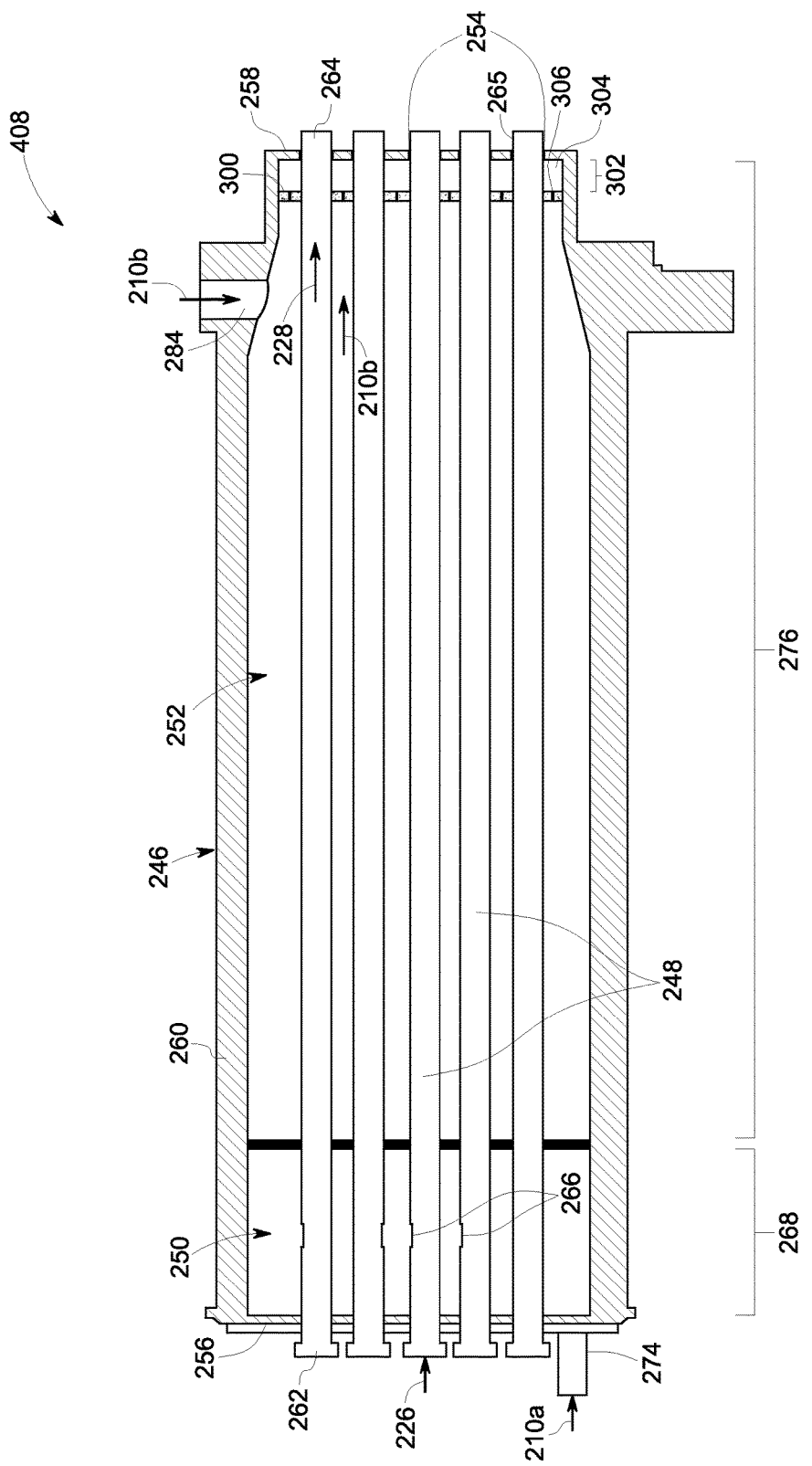
FIG. 5 is a schematic view of a micromixer system in accordance with another exemplary embodiment of the present invention.

FIG. 5 illustrates a schematic view of a micromixer system 408 in accordance with another exemplary embodiment. An annular gap 254 is formed around a circumference 265 of an outlet 264 of a respective pipe from a plurality of pipes 248 rather than the plurality of openings 154 formed surrounding the outlet 164 of the respective pipe 148 as shown in the embodiment of FIGS. 3 and 4.

In the illustrated embodiment of FIG. 5 a casing 246 includes a first side wall 256, a second side wall 258, and an intermediate wall 260. The first side wall 256 is coupled to the second side wall 258 through the intermediate wall 260. The plurality of pipes 248 is spaced apart from each other and disposed within the casing 246. Each pipe 248 includes an inlet 262 and the outlet 264. The inlet 262 is disposed in the first side wall 256 and the outlet 264 is disposed in the second side wall 258. Each pipe 248 includes at least one hole 266 for fluidically coupling to the first plenum 250. The inlet 262 and the outlet 264 protrude outwards from the first and second side walls 256, 258 respectively. The first plenum 250 is formed within the casing 246 and disposed around a first portion 268 of the plurality of pipes 248. The first plenum 250 includes a first inlet 274 disposed in the first side wall 256. The second plenum 252 is formed within the casing 246 and disposed around a second portion 276 of the plurality of pipes 248. The second plenum 252 includes a second inlet 284 disposed in the intermediate wall 260.

The micromixer system 408 further includes an effusion plate 300 disposed proximate to the second side wall 258 and around a sub-portion 302 of the second portion 276 of the plurality of pipes 248. The effusion plate 300 defines an effusion area 304 between the second side wall 258 and the effusion plate 300. The effusion plate 300 includes a plurality of through-holes 306 for fluidically coupling the second plenum 252 to the effusion area 304.

Similar to the plurality of openings 154 shown in the embodiment of FIGS. 3 and 4, in the illustrated embodiment, the annular gaps 254 is formed in the second side wall 258, around the circumferences 265 of the outlets 264 of at least some pipes of the plurality of pipes 248. The annular gaps 254 are fluidically coupled to the second plenum 252 through the effusion area 304.

During operation of the micromixer system 408, each pipe 248 receives compressed air 226 through the inlet 262 and the first plenum 250 receives a first fuel 210a through the first inlet 274. The first fuel 210a is fed from the first plenum 250 into each pipe 248 via the at least one hole 266.

The compressed air 226 and the first fuel 210a are mixed within each pipe 248 to generate an air-fuel mixture 228. The air-fuel mixture 228 is then directed through the outlet 264 of each pipe 248. The second plenum 252 receives a second fuel 210b via the second inlet 284. The second fuel 210b is fed from the second plenum 252 into the effusion area 304 via the plurality of through-holes 306. The second fuel 210b is then fed from the effusion area 304 via the annular gaps 254 resulting in cooling of at least a portion of the second side wall 258.

Figure 6:
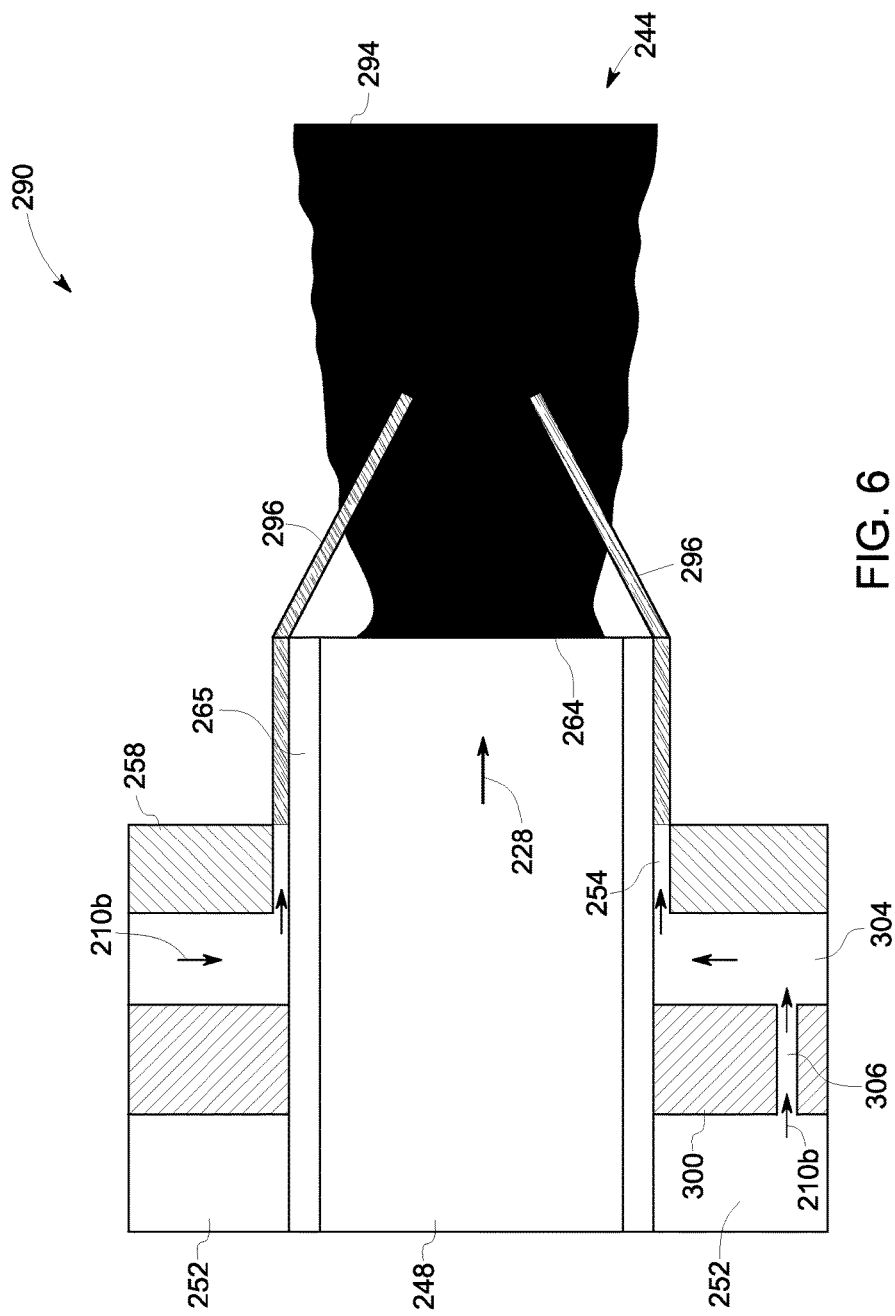
FIG. 6 is a schematic view of a portion of the micromixer system in accordance with the exemplary embodiment of FIG. 5.

FIG. 6 illustrates a schematic view of a portion 290 of the micromixer system 408 in accordance with the exemplary embodiment of FIG. 5. The portion 290 illustrates an exit of the micromixer system 408.

As discussed earlier, the air-fuel mixture 228 is directed through the outlet 264 of each pipe 248 into a combustion chamber 244. The air-fuel mixture 228 is combusted in the combustion chamber 244 to generate a first flame 294. The second fuel 210b is directed through each opening 254 (i.e. annular gap) into the combustion chamber 244. Specifically, the second fuel 210b is directed to the air-fuel mixture 228 in the combustion chamber 244. The second fuel 210b is then combusted in the combustion chamber 244 to generate a second flame 296 that then intersects with the first flame 294.

The quantity of the second fuel 210b and the first fuel 210a in the air-fuel mixture 228 fed to the combustion chamber 244 may be regulated based on operating conditions of the gas turbine system 100.

In accordance with one or more embodiments discussed herein, an exemplary micromixer system facilitates to enhance a turndown capability of a turbine system by varying a quantity of a second fuel fed to a combustion chamber during a full speed and/or no load condition of the turbine system. Further, the micromixer system facilitates a very stable combustion environment within a combustor resulting in a substantially low emission. The micromixer enables to operate the combustor without loosing the flame during a low flame temperature condition.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A micromixer system comprising:
a casing comprising a first side wall a second side wall;
a plurality of pipes spaced apart from each other and disposed within the casing, wherein each pipe from the plurality of pipes, comprises an inlet formed in the first side wall and an outlet formed in the second side wall, wherein the plurality of pipes is configured to receive air;
a first fuel plenum comprising a first inlet formed in the casing, wherein the first fuel plenum is disposed around a first portion of the plurality of pipes, and fluidically coupled to the plurality of pipes, wherein the first fuel plenum is configured to receive a first fuel, and wherein the plurality of pipes is configured to receive the first fuel from the first fuel plenum, mix the air and the first fuel to generate an air-fuel mixture, and direct the air-fuel mixture to a combustion chamber via a corresponding outlet to generate a first flame;
a second fuel plenum comprising a second inlet formed in the casing and disposed around a second portion of the plurality of pipes, wherein the second fuel plenum is configured to receive a second fuel;
a plurality of channels extending through the second side wall such that each channel from the plurality of channels is surrounded by the second side wall and fluidically coupled to the second fuel plenum; and
a plurality of openings formed in the second side wall, surrounding outlets of at least some pipes of the plurality of pipes, and fluidically coupled to the second fuel plenum via a corresponding channel from the plurality of channels, wherein the second fuel plenum is configured to direct the second fuel to the air-fuel mixture in the combustion chamber via the plurality of openings to generate a second flame intersecting the first flame.

2. The micromixer system of claim 1, wherein each pipe from the plurality of pipes, comprises at least one hole for fluidically coupling to the first fuel plenum.

3. The micromixer system of claim 1, wherein each channel from the plurality of channels is tilted at an angle relative to at least one pipe from the plurality of pipes.

4. The micromixer system of claim 1, wherein the casing further comprises an intermediate wall, wherein the first side wall is coupled to the second side wall through the intermediate wall.

5. The micromixer system of claim 4, wherein the second inlet is formed in the intermediate wall.

6. A gas turbine system comprising:
a combustor comprising a liner;
a flow sleeve disposed around the liner and proximate to a head-end of the combustor; and
a micromixer system disposed proximate to the head-end, wherein the micromixer system comprises:
a casing comprising a first side wall a second side wall;
a plurality of pipes spaced apart from each other and disposed within the casing, wherein each pipe from the plurality of pipes, comprises an inlet formed in the first side wall and an outlet formed in the second side wall, wherein the plurality of pipes is configured to receive air;
a first fuel plenum comprising a first inlet formed in the casing, wherein the first fuel plenum is disposed around a first portion of the plurality of pipes, and fluidically coupled to the plurality of pipes, wherein the first fuel plenum is configured to receive a first fuel, and wherein the plurality of pipes is configured to receive the first fuel from the first fuel plenum, mix the air and the first fuel to generate an air-fuel mixture, and direct the air-fuel mixture to a combustion chamber via a corresponding outlet to generate a first flame;
a second fuel plenum comprising a second inlet formed in the casing and disposed around a second portion of the plurality of pipes, wherein the second fuel plenum is configured to receive a second fuel;
a plurality of channels extending through the second side wall such that each channel from the plurality of channels is surrounded by the second side wall and fluidically coupled to the second fuel plenum; and
a plurality of openings formed in the second side wall, surrounding outlets of at least some pipes of the plurality of pipes, and fluidically coupled to the second fuel plenum via a corresponding channel from the plurality of channels, wherein the second fuel plenum is configured to direct the second fuel to the air-fuel mixture in the combustion chamber via the plurality of openings to generate a second flame intersecting the first flame.

7. The gas turbine system of claim 6, wherein each channel from the plurality of channels is tilted at an angle relative to at least one pipe from the plurality of pipes.

8. The gas turbine system of claim 6, wherein the casing further comprises an intermediate wall, wherein the first side wall is coupled to the second side wall through the intermediate wall.

9. The gas turbine system of claim 8, wherein the second inlet is formed in the intermediate wall.

10. The gas turbine system of claim 6, wherein each pipe from the plurality of pipes comprises at least one hole for fluidically coupling to the first fuel plenum.

* * * * *